(12) United States Patent
Lim et al.

(10) Patent No.: US 8,934,397 B2
(45) Date of Patent: Jan. 13, 2015

(54) METHOD AND APPARATUS FOR RELAYING DATA IN WIRELESS COMMUNICATION SYSTEM

(75) Inventors: Dong Guk Lim, Anyang-si (KR); Jong Young Han, Anyang-si (KR); Han Gyu Cho, Anyang-si (KR); Yeong Hyeon Kwon, Anyang-si (KR); Sung Ho Moon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 796 days.

(21) Appl. No.: 13/255,823

(22) PCT Filed: Mar. 11, 2010

(86) PCT No.: PCT/KR2010/001512
§ 371 (c)(1),
(2), (4) Date: Sep. 9, 2011

(87) PCT Pub. No.: WO2010/104333
PCT Pub. Date: Sep. 16, 2010

(65) Prior Publication Data
US 2011/0317619 A1 Dec. 29, 2011

Related U.S. Application Data

(60) Provisional application No. 61/159,812, filed on Mar. 13, 2009.

(51) Int. Cl.
*H04B 7/14* (2006.01)
*H04B 7/26* (2006.01)
*H04W 72/04* (2009.01)
*H04W 84/04* (2009.01)
*H04W 88/04* (2009.01)

(52) U.S. Cl.
CPC .......... *H04B 7/2606* (2013.01); *H04B 7/2656* (2013.01); *H04W 72/04* (2013.01); *H04W 84/047* (2013.01); *H04W 88/04* (2013.01)
USPC ........................................................ 370/315

(58) Field of Classification Search
CPC ... H04B 7/2606; H04B 7/2656; H04W 72/04; H04W 84/047; H04W 88/04
USPC ........................................................ 370/315
See application file for complete search history.

(56) References Cited

U.S. PATENT DOCUMENTS

| 7,197,690 B2* | 3/2007 | Shen et al. | 714/792 |
| 2007/0097945 A1* | 5/2007 | Wang et al. | 370/349 |
| 2008/0165776 A1* | 7/2008 | Tao et al. | 370/392 |
| 2008/0219205 A1 | 9/2008 | Kang et al. | |
| 2009/0016290 A1* | 1/2009 | Chion et al. | 370/329 |

* cited by examiner

*Primary Examiner* — Asad Nawaz
*Assistant Examiner* — Saad A Waqas
(74) *Attorney, Agent, or Firm* — Birch, Stewart, Kolasch & Birch, LLP (57) ABSTRACT

A method and apparatus of relaying data in a wireless communication system is provided. A relay station (RS) receives relay zone allocation information. A plurality of relay zones is allocated in a resource region by the relay zone allocation information. The relay station receives data transmitted from a super-ordinate station, detects a tunneling traffic destined to a subordinate station from the data, and transmits the tunneling traffic to the subordinate station. The tunneling traffic is transmitted over one of the plurality of relay zones.

9 Claims, 7 Drawing Sheets

METHOD AND APPARATUS FOR RELAYING DATA IN WIRELESS COMMUNICATION SYSTEM

This application is the National Phase of PCT/KR2010/001512 filed on Mar. 11, 2010, which claims priority under 35 U.S.C. 119(e) to U.S. Provisional Application No. 61/159,812 filed on Mar. 13, 2009, all of which are hereby expressly incorporated by reference into the present application.

TECHNICAL FIELD

The present invention relates to wireless communications, and more particularly, to a method and apparatus for relaying data in a wireless communication system.

BACKGROUND ART

The institute of electrical and electronics engineers (IEEE) 802.16e standard was adopted in 2007 as a sixth standard for international mobile telecommunication (IMT)-2000 in the name of 'WMAN-OFDMA' by the ITU-radio communication sector (ITU-R) which is one of sectors of the international telecommunication union (ITU). An IMT-advanced system has been prepared by the ITU-R as a next generation (i.e., $4^{th}$ generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

Effective transmission/reception methods and utilizations have been proposed for a broadband wireless communication system to maximize efficiency of radio resources. An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference.

When a system uses the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner. In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain.

Meanwhile, a wireless communication system employing a relay station (RS) has recently been developed. The RS is employed for cell coverage extension and transmission capability improvement. A base station (BS) provides a service to a mobile station (MS) located in a coverage boundary of the BS via the RS, and thus can obtain an effect of extending the cell coverage. In addition, the RS improves signal transmission reliability between the BS and the MS, thereby improving transmission capacity. Even if the MS is located inside the coverage of the BS, the RS may be used when the MS is located in a shadow area.

The RS can be classified into two types. First, a transparent RS is an RS which simply relays data transmitted from the BS to a subordinate RS or the MS while all information necessary for a relay process is determined by the BS. Second, a non-transparent RS is an RS which relays data by directly performing resource allocation, modulation and coding scheme (MCS) level determination, power control, or the like necessary for the relay process.

The RS may use a relay scheme, such as amplify and forward (AF) and decode and forward (DF). In the AF, the RS amplifies data transmitted from the BS and then delivers the data to the MS. In the DF, the RS identifies a destination station by decoding the data transmitted from the BS, and then relays the data to the destination station, i.e., the subordinate RS or the MS, by encoding the decoded data. Therefore, when using the DF, a delay time of data transmission increases along with the progression of a relay operation in a multi-hop relay environment in which a plurality of RSs constitute a layer.

Accordingly, there is a need for an effective data relay method.

SUMMARY OF INVENTION

Technical Problem

The present invention provides a method and apparatus for relaying data in a wireless communication system.

Solution to Problem

In an aspect, a method of relaying data in a wireless communication system is provided. The method include receiving relay zone allocation information, a plurality of relay zones being allocated in a resource region by the relay zone allocation information, receiving data transmitted from a superordinate station, detecting a tunneling traffic destined to a subordinate station from the data, and transmitting the tunneling traffic to the subordinate station, wherein the tunneling traffic is transmitted over one of the plurality of relay zones. The one of the plurality of relay zones may comprise a subordinate relay zone which is allocated to the subordinate station by the relay zone allocation information. The method may further include decoding the remaining data except the tunneling traffic. The method may further include modulating the tunneling traffic by modulation scheme different from the current modulation scheme. The tunneling traffic may be detected based on a constellation value of a symbol level or a log likelihood ratio (LLR) of a bit level. The relay zone allocation information may comprise one of an identification (ID) of a relay zone, an ID of a relay station in which the relay zone is allocated, a size or a length of the relay zone, and a start point or an end point of the relay zone in the resource region. The method may further include receiving tunneling zone allocation information, wherein the tunneling traffic is transmitted over a subordinate tunneling zone which is allocated in the subordinate relay zone by the tunneling zone allocation information. The tunneling zone allocation information may comprise one of an identification (ID) of a relay zone in which a tunneling zone is allocated, an ID of the tunneling zone, a size or a length of the tunneling zone, a start point or an end point of the tunneling zone in the resource region, and an offset value. The data transmitted from the super-ordinate station may be transmitted over each of the plurality of relay zones allocated for respective destination stations of the data. The data transmitted from the super-ordinate station may be mapped to a medium access control (MAC) protocol data unit (PDU) which is generated for each destination station of the data. The MAC PDU of the destination station may be combined with a MAC PDU of another destination station existing on the same path. The relay zone allocation information may be transmitted from a base station or a higher layer.

In another aspect, a method of relaying data in a wireless communication system is provided. The method include receiving relay zone allocation information, a plurality of relay zones being allocated in a resource region by the relay zone allocation information, receiving data transmitted from a subordinate station, detecting a tunneling traffic destined to a super-ordinate station from the data, and transmitting the tunneling traffic to the super-ordinate station, wherein the tunneling traffic is transmitted over one of the plurality of relay zones. The one of the plurality of relay zones may comprise a super-ordinate relay zone which is allocated to the super-ordinate station by the relay zone allocation information. The method may further include receiving a tunneling zone allocation information, wherein the tunneling traffic is transmitted over a super-ordinate tunneling zone which is allocated in the super-ordinate relay zone by the tunneling zone allocation information. A feedback corresponding to a downlink (DL) transmission may be transmitted over the super-ordinate tunneling zone. The relay zone allocation information may be transmitted from a base station or a higher layer.

In another aspect, a relay station (RS) in a wireless communication system is provided. The RS include a radio frequency (RF) unit for transmitting and receiving a radio signal, a detection unit configured to detect tunneling traffic destined to a subordinate station, and a controller operatively coupled to the detection unit and configured to receive relay zone allocation information, a plurality of relay zones being allocated in a resource region by the relay zone allocation information, receive data transmitted from a super-ordinate station, and transmit the tunneling traffic to the subordinate station, wherein the tunneling traffic is transmitted over one of the plurality of relay zones.

Advantageous Effects of Invention

According to the present invention, when data is relayed by relay stations, each relay station uses a specific region allocated for data relaying, and thus can easily detect data transmitted to the relay station. In addition, since data forms a protocol data unit (PDU) for each relay station, each relay station can decode data transmitted only to the relay station itself and thus a time delay of data transmission can be avoided.

MODE FOR THE INVENTION

A technology below can be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented using radio technology, such as Universal Terrestrial Radio Access (UTRA) or CDMA2000. TDMA can be implemented using radio technology, such as Global System for Mobile communications (GSM)/General Packet Radio Service (GPRS)/Enhanced Data Rates for GSM Evolution (EDGE). OFDMA can be implemented using radio technology, such as IEEE 802.11 (Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a Universal Mobile Telecommunications System (UMTS). 3rd Generation Partnership Project (3GPP) Long Term Evolution (LET) is part of Evolved UMTS (E-UMTS) using Evolved-UMTS Terrestrial Radio Access (E-UTRA), and it adopts OFDMA in downlink (DL) and SC-FDMA in uplink (UL). LTE-A (Advanced) is the evolution of 3GPP LTE.

IEEE 802.16m is chiefly described as an example in order to clarify the description, but the technical spirit of the present invention is not limited to IEEE 802.16e.

Figure 1:
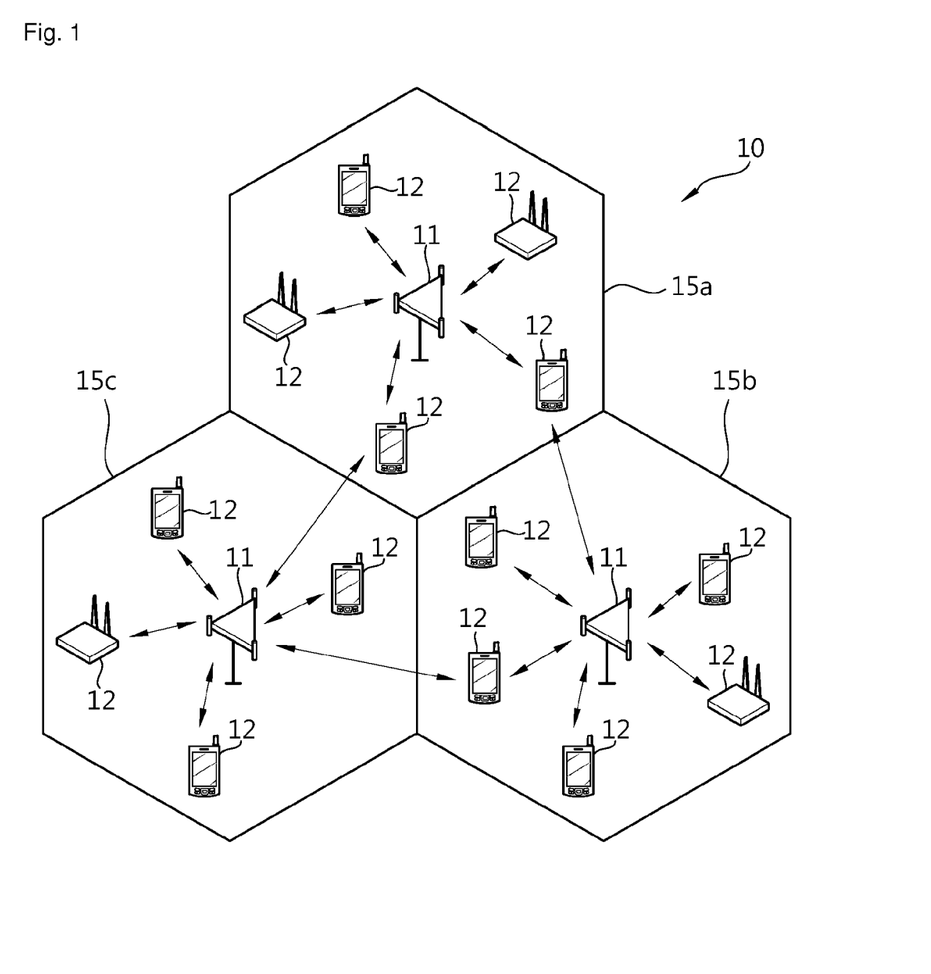
FIG. 1 shows a wireless communication system.

FIG. 1 shows a wireless communication system.

Referring to FIG. 1, the wireless communication system 10 includes one or more Base Stations (BSs) 11. The BSs 11 provide communication services to respective geographical areas (in general called 'cells') 15a, 15b, and 15c. Each of the cells can be divided into a number of areas (called 'sectors'). A User Equipment (UE) 12 can be fixed or mobile and may be referred to as another terminology, such as a Mobile Station (MS), a Mobile Terminal (MT), a User Terminal (UT), a Subscriber Station (SS), a wireless device, a Personal Digital Assistant (PDA), a wireless modem, or a handheld device. In general, the BS 11 refers to a fixed station that communicates with the UEs 12, and it may be referred to as another terminology, such as an evolved-NodeB (eNB), a Base Transceiver System (BTS), or an access point.

The UE belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
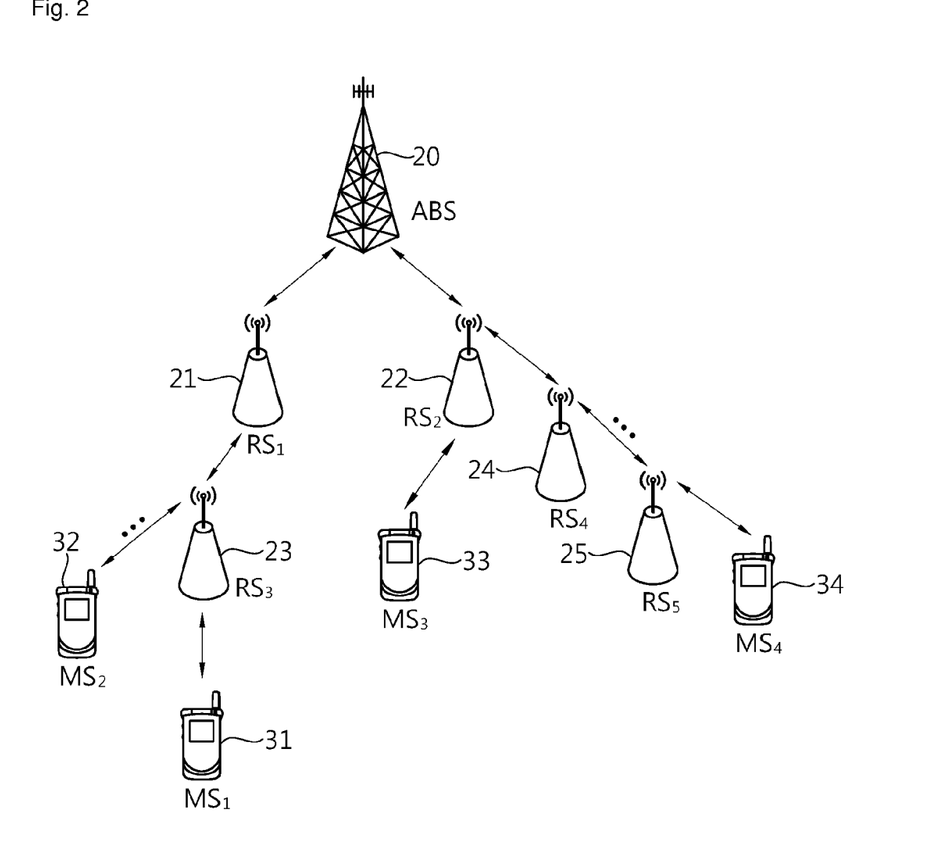
FIG. 2 shows a wireless communication system in a multi-hop relay environment.

FIG. 2 shows a wireless communication system in a multi-hop relay environment.

The multi-hop relay environment is a relay environment in which data is relayed by a plurality of relay stations (RSs) constituting at least two layers. A base station (BS) first transmits data to an RS of a first layer, and the RS of the first layer delivers the data to an RS of a second layer. If there is an RS of a lower layer of the second layer, the RS of the second layer delivers the data to the RS of the lower layer or delivers the data to a mobile station (MS).

In uplink transmission, a source station may be the MS, and a destination stations may be the BS. In downlink transmission, a source station may be the BS, and a destination station may be the MS. The RS may be the MS, or may be provided as a separate RS. The BS may perform functions such as connectivity, management, control, and resource allocation between the RS and the MS.

Referring to FIG. 2, a BS 20 communicates with MSs 31, 32, 33, and 34 via RSs 21, 22, 23, 24, and 25. The BS 20 communicates with the MSs 31 and 32 via the RSs 21 and 23. In downlink transmission, the BS 20 transmits data to the RSs 21 and 23, and the RSs 21 and 23 deliver the data to the MSs 31 and 32 in sequence. Further, the BS 20 communicates with the MS 33 via the RS 22. In downlink transmission, the BS 20 transmits data to the RS 22, and the RS 22 delivers the data to the MS 33. Further, the BS 20 communicates with the MS 34 via the RSs 22, 24, and 25. In downlink transmission, the BS 20 transmits data to the RS 22, 24, and 25, and the RSs 22, 24, and 25 deliver the data to the MS 34 in sequence. Although one BS 20, five RSs, 21, 22, 23, 24, and 25, and four MSs 31, 32, 33, and 34 are shown in FIG. 2, the present invention is not limited thereto. Thus, there is no restriction on the number of BSs, the number of RSs, and the number of MSs included in the wireless communication system.

The RS may use decode and forward (DF) as a relay scheme. The RS identifies a destination station by decoding data transmitted from the BS, and relays the data to the destination station, i.e., a subordinate RS or an MS, by encoding the decoded data. Data to be transmitted to all MSs served by the BS is transmitted by the BS to a first RS connected to the BS. Upon receiving the data, the first RS decodes the data and relays the remaining data other than the data for the first RS to a connected RS of a lower layer. The RS of the lower layer decodes the transmitted data in the similar manner, and delivers the remaining data other than the data for the RS itself to an RS of a lower layer.

Each RS may use a connection identification (CID) for identification of its data from the transmitted data. Each RS may decode the data to detect its data by measuring a CID allocated to the RS. Examples of the CID include an MS-CID, an R-CID, an MT-CID, a T-CID, etc.

Figure 3:
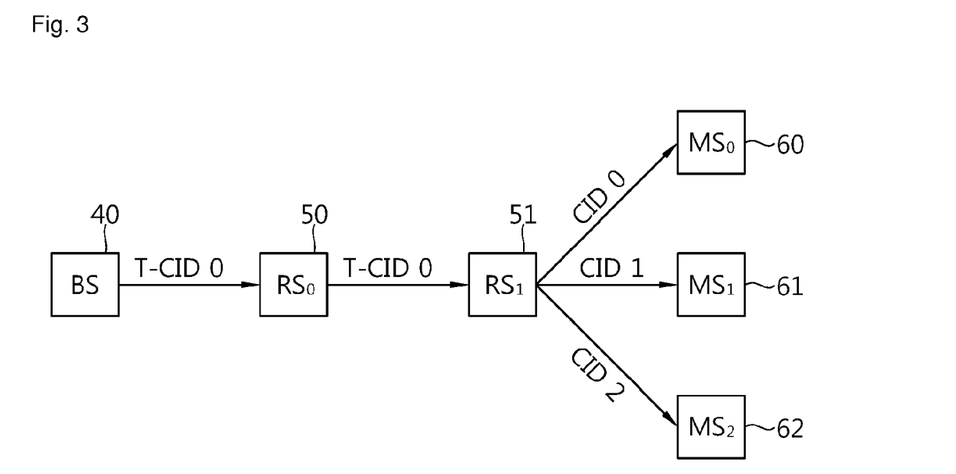
FIG. 3 is a block diagram showing a data transmission process using a connection identification (CID).

FIG. 3 is a block diagram showing a data transmission process using a CID.

A BS 40 transmits data to MSs 60, 61, and 62 via a first RS 50 and a second RS 51. The BS 40 transmits data up to the second RS 51 by using a T-CID of the second RS 51. Since the data has the T-CID of the second RS 51, the first RS 50 delivers the data transmitted from the BS 40 directly to the second RS 51. The second RS 51 transmits specific data selected from the data transmitted up to the second RS 51 to each of the MSs 60, 61, and 62 by using a CID of each of the MSs 60, 61, and 62.

When data is relayed by using DF in a multi-hop relay environment, decoding and encoding are repeated in each layer, which results in a delay of data transmission. Therefore, there is a need for an effective data relay method.

Figure 4:
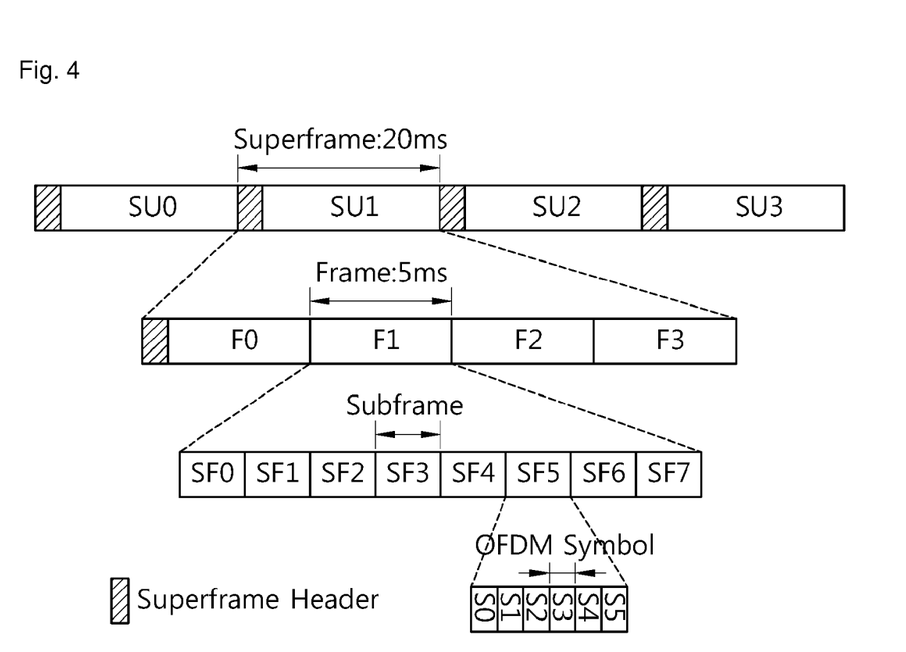
FIG. 4 shows an example of a frame structure.

FIG. 4 shows an example of a frame structure.

Referring to FIG. 4, a superframe (SF) includes a superframe header (SFH) and four frames F0, F1, F2, and F3. Each frame may have the same length in the SF. Although it is shown that each SF has a length of 20 milliseconds (ms) and each frame has a length of 5 ms, the present invention is not limited thereto. A length of the SF, the number of frames included in the SF, the number of SFs included in the frame, or the like can change variously. The number of SFs included in the frame may change variously according to a channel bandwidth and a cyclic prefix (CP) length.

The SFH can carry an essential system parameter and system configuration information. The SFH may be located in a first subframe of the SF. The SFH can be classified into a primary-SFH (P-SFH) and a secondary-SFH (S-SFH). The P-SFH and the S-SFH may be transmitted in every superframe.

One frame includes 8 subframes SF0, SF1, SF2, SF3, SF4, SF5, SF6, and SF7. Each subframe can be used for uplink or downlink transmission. One subframe includes a plurality of orthogonal frequency division multiplexing (OFDM) symbols in a time domain, and includes a plurality of subcarriers in a frequency domain. An OFDM symbol is for representing one symbol period, and can be referred to as other terminologies such as an OFDM symbol, an SC-FDMA symbol, etc., according to a multiple access scheme. The subframe can consist of 5, 6, 7, or 9 OFDM symbols. However, this is for exemplary purposes only, and thus the number of OFDM symbols included in the subframe is not limited thereto. The number of OFDM symbols included in the subframe may change variously according to a channel bandwidth and a CP length. A subframe type may be defined according to the number of OFDM symbols included in the subframe. For example, it can be defined such that a type-1 subframe includes 6 OFDM symbols, a type-2 subframe includes 7 OFDM symbols, a type-3 subframe includes 5 OFDM symbols, and a type-4 subframe includes 9 OFDM symbols. One frame may include subframes each having the same type. Alternatively, one frame may include subframes each having a different type. That is, the number of OFDM symbols included in each subframe may be identical or different in one frame. Alternatively, the number of OFDM symbols included in at least one subframe of one frame may be different from the number of OFDM symbols of the remaining subframes of the frame.

Time division duplexing (TDD) or frequency division duplexing (FDD) may be applied to the frame. In the TDD, each subframe is used in uplink or downlink transmission at the same frequency and at a different time. That is, subframes included in a TDD frame are divided into an uplink subframe and a downlink subframe in the time domain. In the FDD, each subframe is used in uplink or downlink transmission at the same time and at a different frequency. That is, subframes included in an FDD frame are divided into an uplink subframe and a downlink subframe in the frequency domain. Uplink transmission and downlink transmission occupy different frequency bands and can be simultaneously performed.

Hereinafter, the proposed data relay method will be described according to an embodiment of the present invention.

A radio resource region is divided into a plurality of relay zones allocated to respective RSs. Data for each RS may be transmitted over its corresponding relay zone. Further, each relay zone may include its tunneling zone. The tunneling zone is a region over which a specific RS transmits data to be delivered to another RS without performing decoding. That is, the RS may deliver data other than data for the RS itself over the tunneling zone directly to another RS without performing decoding. The tunneling zone may be configured in either an uplink zone or a downlink zone or both an uplink zone and a downlink zone.

Figure 5:
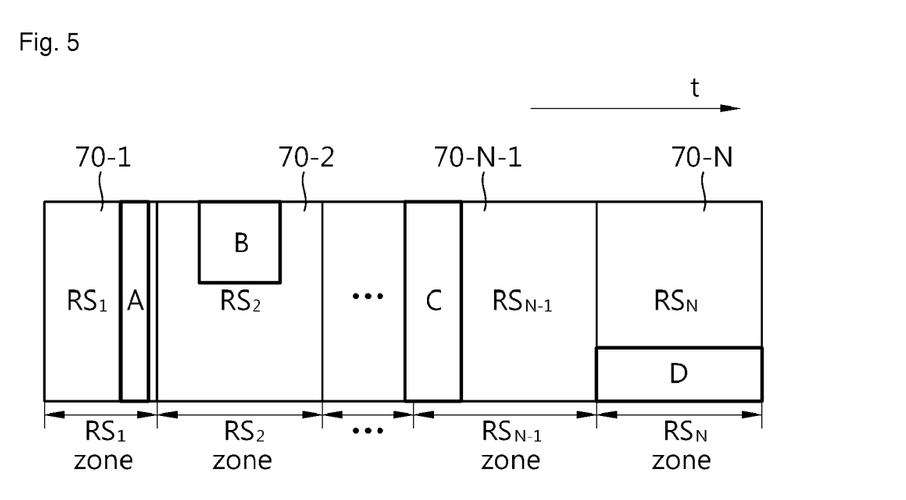
FIG. 5 shows an example of a radio resource region in which a relay zone and a tunneling zone are allocated.

FIG. 5 shows an example of a radio resource region in which a relay zone and a tunneling zone are allocated.

The radio resource region includes N relay zones 70-1, 70-2, . . . , 70-N. Each relay zone is a resource region to be allocated to each RS. That is, the first relay zone 70-1 is a resource region to be allocated to a first RS, the second relay zone 70-2 is a resource region to be allocated to a second RS, and the $N^{th}$ relay zone is a resource region to be allocated to an $N^{th}$ RS. Each RS may include a tunneling zone. The first relay zone 70-1 includes a tunneling zone A, and the second relay zone 70-2 includes a tunneling zone B. The $N^{th}$ relay zone 70-N includes a tunneling zone D. Further, two or more relay zones may share one tunneling zone. The $(N-1)^{th}$ relay zone shares a tunneling zone C with its adjacent relay zone. In addition, each relay station may use a common resource region as a tunneling zone of each relay station. Also, each relay station may allocate and use a radio resource in the common resource region for each relay station. Each relay zone may be allocated variously over the resource region. Each tunneling zone may be multiplexed using time division multiplexing (TDM), frequency division multiplexing (FDM), etc. Alternatively, each tunneling zone may be multiplexed by combining the TDM and the FDM.

The tunneling zone may have the following features.

1) Data transmitted over a specific tunneling zone (hereinafter, such data is referred to as tunneling traffic) may occupy the same number of subcarriers in each relay zone.

2) If specific tunneling traffic is relayed, a modulation scheme may be modified in each RS. For example, data transmitted using 16-quadrature amplitude modulation (QAM) may be transmitted using 64-QAM via another RS.

3) The specific tunneling zone may be positioned in a specific location in each relay zone, i.e., a fixed location such as a start point or end point of a physical or logical resource region of a specific relay zone.

4) The specific tunneling zone may occupy the same sub-carrier in all relay zones.

5) For the support of the tunneling zone, each relay zone may have a size greater than or equal to a specific value so that a specific RS has a sufficient time of receiving an OFDM symbol and detecting a symbol of a transmit signal. For example, each relay zone may have a size of two or more OFDM symbols.

6) When the specific tunneling traffic is relayed by modifying a modulation scheme in an RS, the tunneling zone may have a different size according to each relay zone.

7) A destination station of the tunneling zone or the tunneling traffic may be one RS or MS or may be an RS group, an MS group, or a BS.

8) The tunneling zone may be defined in either an uplink zone or a downlink zone or both an uplink zone and a downlink zone. And each RS may use either AF or DF when data is relayed.

9) There is no need to transmit Acknowledgement (ACK)/non-acknowledgement (NACK) for the tunneling traffic. However, data may be first delivered to an RS of a next layer and ACK/NACK may be generated by decoding the data. When the data is retransmitted at a later time, an RS which has successfully transmitted the data may transmit the data instead of the RS of the next layer.

For the support of the tunneling zone, the RS has to be able to rapidly detect a constellation value of a symbol level or a log likelihood ratio (LLR) of a bit level with respect to the tunneling traffic. In a case where the modulation scheme is modified in the RS, the RS needs to include a symbol detection function or a modulation function to modify the modulation scheme. In addition, if an antenna configuration is different between one RS to another, a MIMO mode may differ for individual tunneling traffic. In this case, the tunneling zone is defined according to a change in the modulation scheme according to a change in the MIMO mode, a change in a size of allocating sub-carriers, and a change in a rank. For the support of such operations, the BS and the RS need to exchange control information. The control information may be transmitted by performing joint coding or separate coding with data.

The control information exchanged between the BS and the RS may include the following information.

1) Destination station information of a specific tunneling zone: information indicating whether a destination station is an RS or an MS or an RS group or an MS group may be included.

2) An ID of the specific tunneling zone and resource allocation information of the specific tunneling zone: if a relay zone corresponding to each RS is allocated in a different format, the resource allocation information may be transmitted for each relay zone. In this case, a BS may process resource allocation information of a tunneling zone to be allocated to all RSs, or each RS may process only resource allocation information of an uplink or downlink relay zone necessary for the RS itself. The necessary control information may be information on one hop.

3) Effective time information of the specific tunneling zone: information on start timing of the tunneling zone, an effective time, and end timing may be included.

4) Power allocation information in each RS for the specific tunneling zone

5) ACK/NACK information of the specific tunneling zone

6) Tunneling path information for the specific tunneling zone

7) MIMO mode information of each RS for the specific tunneling zone

8) Feedback information for a control signal for channel measurement between a BS and an RS, between an RS and another RS, or between an RS and an MS, or measured channel information 9) Relay scheme information: information indicating whether a scheme in use is AF, DF, or 'detection & forward' may be included.

Figure 6:
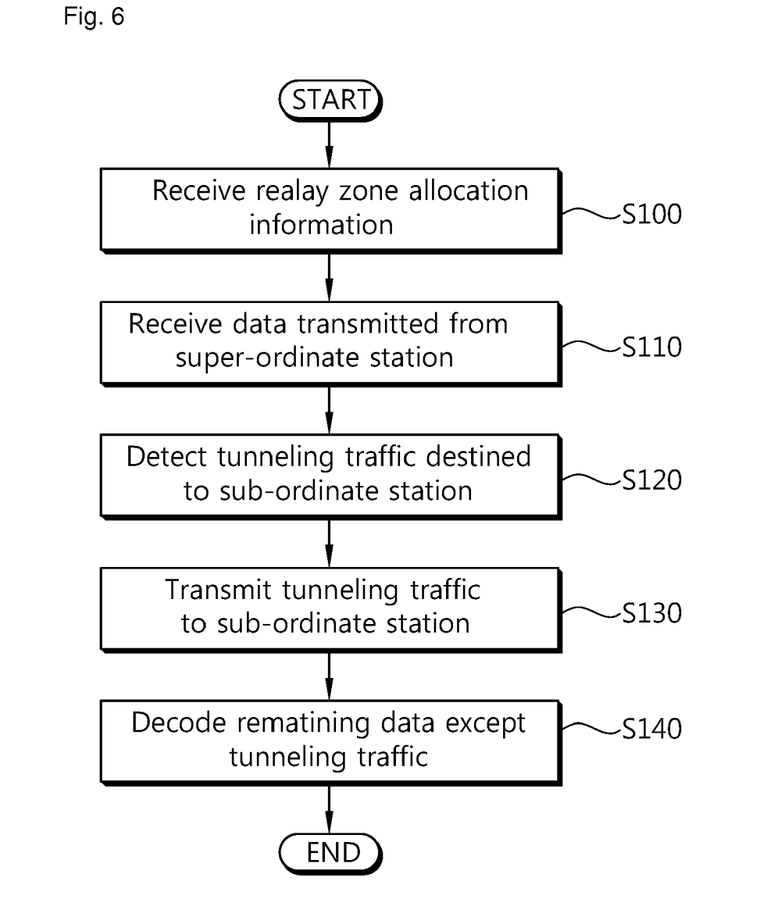
FIG. 6 is a flowchart showing an embodiment of a proposed data relay method.

10) Information necessary for decoding, such as channel encoding, modulation, or the like used in the specific tunneling zone FIG. 6 is a flowchart showing an embodiment of the proposed data relay method. The present embodiment shows a data relay method in downlink transmission. Although data is relayed between RSs in the present embodiment, the proposed method is not limited thereto, and thus can also apply between a BS and an RS or between the RS and an MS.

In step S100, the RS receives relay zone allocation information for allocating a plurality of relay zones in a resource region.

The RS may receive the relay zone allocation information from the BS or a higher layer. The relay zone may be allocated for each RS. The relay zone allocation information may be transmitted by considering a size of data transmitted by the RS. The relay zone allocation information may include a variety of information such as an ID of the RS, an ID of the relay zone, a start point and end point of the relay zone over the resource region, a length or size of the relay zone, etc. Further, information on a subordinate station may be included such as an ID of the subordinate station and relay zone resource allocation information corresponding to the subordinate station.

In addition, the RS may receive tunneling zone allocation information for resource allocation of a tunneling zone formed in the relay zone. The tunneling zone allocation information may also be transmitted from the BS or the higher layer. The tunneling zone allocation information may include a variety of information such as an ID of the relay zone to which the tunneling zone belongs, an ID of the tunneling zone, a start point and end point over the resource region to which the tunneling zone is allocated, a length of the tunneling zone, a time or frequency offset, etc. The BS or the higher layer may create and transmit a list of the tunneling zone allocation information, or may transmit the list in a bitmap format to the RS. Further, the tunneling zone allocation information may include allocation information of a tunneling zone to be allocated to another RS in addition to allocation information of a tunneling zone to be allocated to a specific RS.

In step S110, the RS receives data transmitted from a super-ordinate station.

The data received by the RS can be identified by data destined to the RS itself and tunneling traffic destined to a subordinate station. The tunneling traffic does not need to be decoded in the RS. Therefore, the RS may detect whether the data is tunneling traffic, and if it is the tunneling traffic, may transmit the data to the subordinate station without performing decoding. Since decoding and encoding processes for the tunneling traffic are skipped, a delay of data transmission can be avoided in comparison with the conventional relay method.

The data may be transmitted over a relay zone allocated by the relay zone allocation information. In this case, the data may be transmitted over a relay zone allocated to an RS currently receiving the data. For example, in FIG. 5, all data received by the first RS may be transmitted over the first relay zone 70-1. Alternatively, data to be transmitted to destination stations may be transmitted over relay zones allocated to the respective destination stations. For example, in FIG. 5, data destined to the first RS may be transmitted over the first relay zone 70-1, and data destined to the second RS may be transmitted over the second relay zone 70-2.

When data to be transmitted to each destination station is transmitted over the relay zone allocated to each destination station, the data may be transmitted over a tunneling zone allocated in each relay zone. For example, in FIG. 5, data destined to the first RS is transmitted over the tunneling zone A formed in the first relay zone 70-1, and data destined to the second RS may be transmitted over the tunneling zone B formed in the second relay zone 70-2.

In step S120, the RS detects tunneling traffic destined to the subordinate station from the received data.

In step S130, the RS transmits the tunneling traffic to the subordinate station. The tunneling traffic is transmitted over a subordinate relay zone allocated to the subordinate station by the relay zone allocation information. Alternatively, the tunneling traffic may be transmitted over the subordinate tunneling zone allocated in the subordinate relay zone.

In step S140, the RS decodes the remaining data other than the tunneling traffic.

Figure 7:
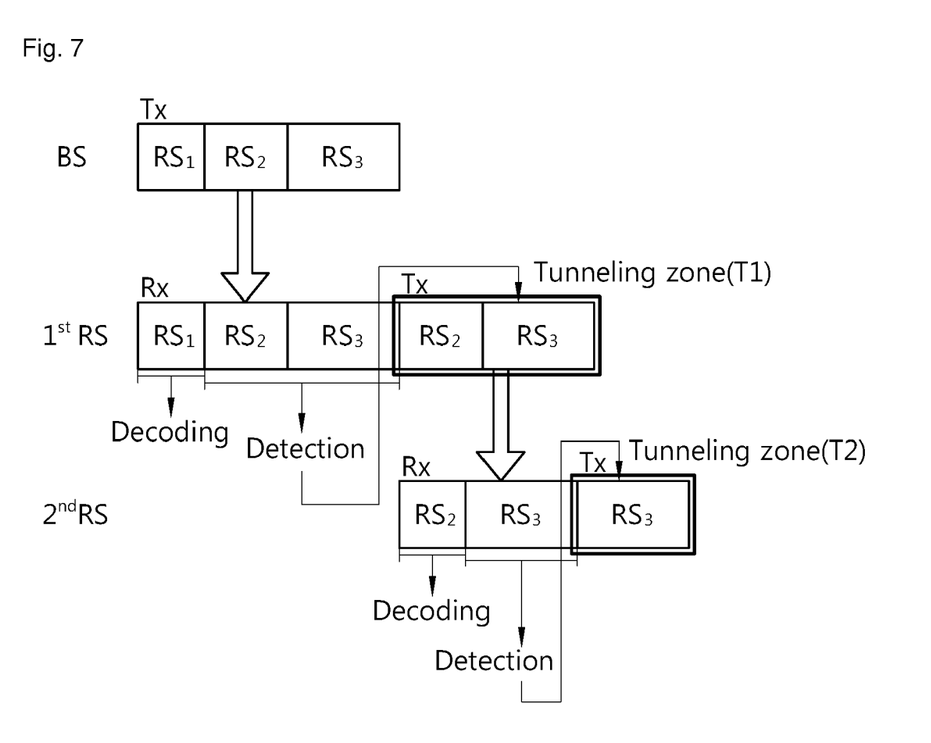
FIG. 7 shows an example of a resource region according to a proposed data relay method.

FIG. 7 shows an example of a resource region according to the proposed data relay method.

A resource region used for downlink transmission of a BS includes a first relay zone RS1, a second relay zone RS2, and a third relay zone R3. Over each of the relay zones RS1, RS2, and RS3, the BS transmits data for the RS to which each relay zone is allocated. That is, the BS transmits all data for the RSs existing on the same path. A first RS receives data transmitted over the first relay zone RS1 and decodes the data. In addition, the first RS detects data received over the second relay zone RS2 and the third relay zone RS3 and determines that the data is not for the first RS itself. Then, the first RS directly transmits the data to the second RS. In this case, the data received over the second relay zone RS2 and the third relay zone RS3 may also be transmitted to the second RS over a first tunneling zone T1. The data transmitted over the first tunneling zone may be amplified when transmitted. Likewise, the second RS receives data transmitted over the second relay zone RS2 and decodes the data. In addition, the second RS detects data received over the third relay zone RS3 and determines that the data is not for the second RS itself. Then, the second RS directly transmits the data to the third RS. In this case, the data received over the third relay zone RS3 may also be transmitted to the third RS over a second tunneling zone T2. The data transmitted over the second tunneling zone may be amplified when transmitted.

Meanwhile, in order for the RS to easily identify the data and tunneling traffic destined to the RS itself, a medium access control (MAC) protocol data unit (PDU) may be formed so that data for the RS itself can be decoded.

Figure 8:
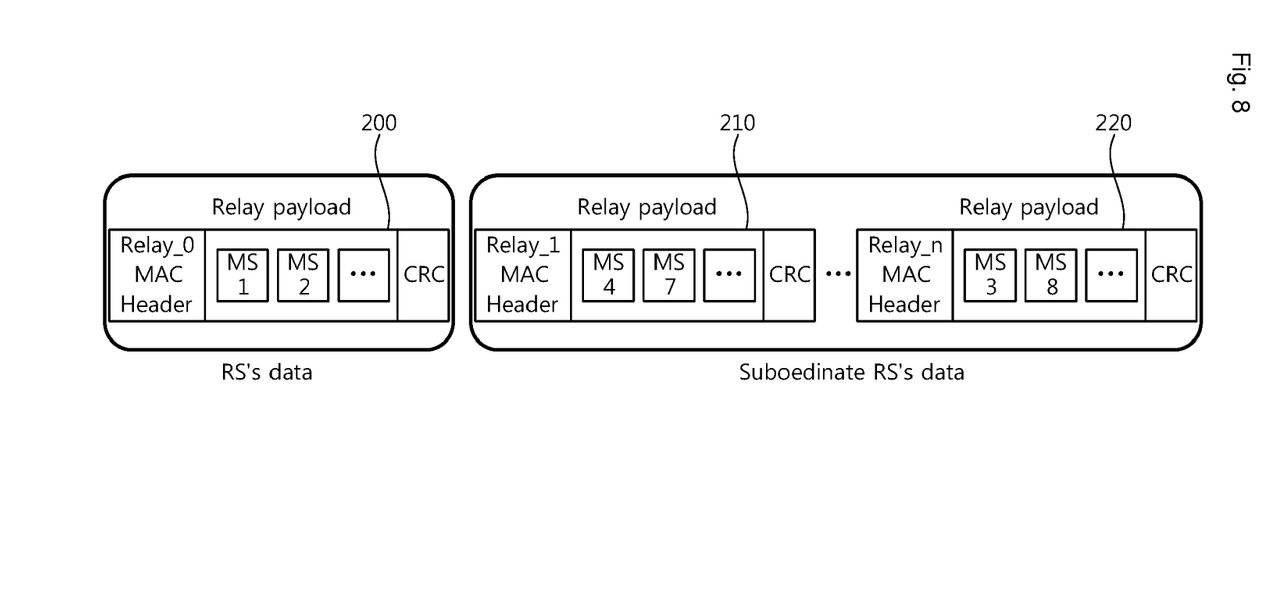
FIG. 8 shows an example of a medium access control (MAC) protocol data unit (PDU) used for data transmission in a proposed data relay method.

FIG. 8 shows an example of a MAC PDU used for data transmission in the proposed data relay method.

Referring to FIG. 8, a BS generates an individual MAC PDU for each RS, generates a tunneling packet by combining MAC PDUs of RSs on the same path, and transmits the tunneling packet to the RSs. The tunneling packet is formed to concurrently transmit data of the RSs on the same path. There is no need to add an additional coding and parity bit for the tunneling packet. Each tunneling packet may include a MAC header. The MAC header may include information on an ID of an RS, an ID of an MS served by the RS, and data of each MS. By detecting the MAC header, the RS can easily determine whether the data is tunneling traffic or data for the RS itself.

In addition, each tunneling packet includes data to be received by MSs connected to each RS. In FIG. 8, a tunneling packet 200 for an RS0 includes data for an MS1 and an MS2, and a tunneling packet 210 for an RS2 includes data for an MS4 and an MS7. A tunneling packet 220 for an RSn includes data for an MS3 and an MS8. Upon receiving the tunneling data, the RS can transmit each MS's data included in the tunneling packet to each MS.

Hereinafter, a data relay method in uplink transmission will be described according to an embodiment of the present invention. The aforementioned data relay method in downlink transmission may also be used in uplink transmission without alteration.

Upon receiving data, an RS or an MS needs to transmit information such as ACK/NACK for the received data, a channel quality indicator (CQI), or the like to a super-ordinate RS or a BS. In this case, similarly to a case where the superordinate RS or the BS transmits data over a tunneling zone, a subordinate RS or the MS may configure a tunneling zone in each relay zone in order to transmit uplink data to the super-ordinate RS or the BS. The tunneling zone may be used as a feedback channel or an uplink (UL) dedicated channel.

To allocate the tunneling zone of uplink transmission, the super-ordinate RS or the BS may allocate the tunneling zone to a resource region of each RS. The super-ordinate RS or the BS may transmit information such as resource allocation information of the tunneling zone, a length of the tunneling zone, a time/frequency offset, or the like to a subordinate BS or the MS in order to allocate the tunneling zone. In addition, allocation of the relay zone and the tunneling zone may be performed at the request of the subordinate RS or the MS. The subordinate RS or the MS to which the tunneling zone is allocated transmits uplink data over the tunneling zone. In this case, the allocated tunneling zone may be independent or common for each RS. In a case where subordinate RSs transmit data by using the common tunneling zone, the super-ordinate RS may receive a signal transmitted by each subordinate RS by identifying the signal for each RS. In this case, data transmitted using the common tunneling zone may be multiplexed by FDM/CDM or the like. Alternatively, an orthogonal sequence, hopping, or the like may be used.

In addition, each subordinate RS may use an individual relay zone or tunneling zone allocated to each RS in order to transmit data to the super-ordinate RS. When the BS controls operations of all RSs, each RS may transmit data to the super-ordinate RS over a tunneling zone allocated to the RS itself by adding the data to be transmitted by the RS itself to data transmitted from the subordinate RS over an individual tunneling zone, or may transmit data to the super-ordinate RS by bundling the data received from the subordinate RS to the data to be transmitted by the RS itself.

Finally, when the BS receives data transmitted from each RS, there is a need to identify the data transmitted by each RS. Therefore, each RS may transmit the data together with information ch as an RS ID or an indicator or the like for identifying which RS transmits the data. Alternatively, each RS may transmit the data over the tunneling zone in sequence so that the BS can identify the transmitted data.

Figure 9:
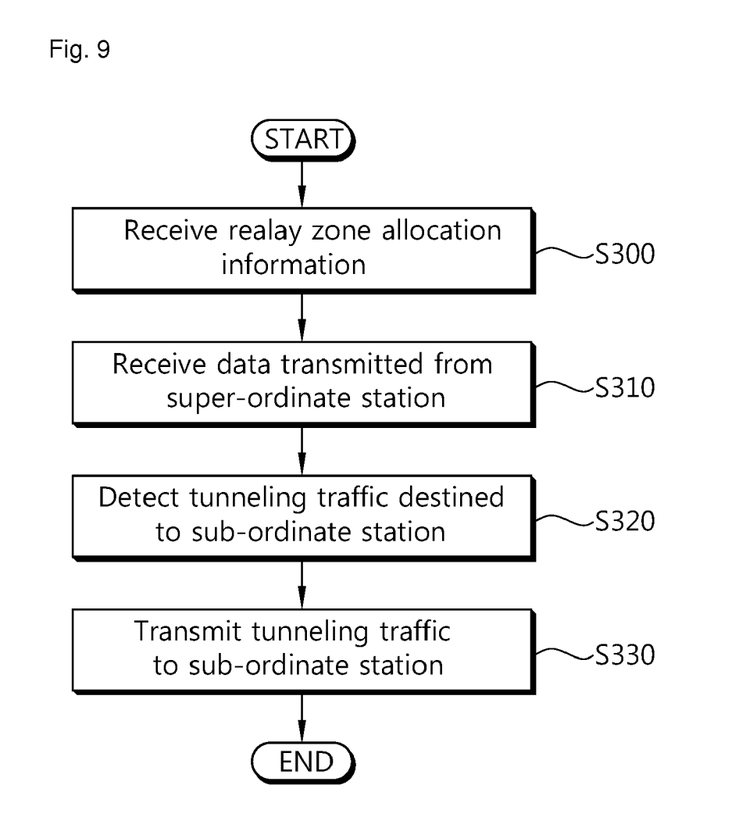
FIG. 9 is a flowchart showing another example of the proposed data relay method.

FIG. 9 is a flowchart showing another example of the proposed data relay method.

In step S300, an RS receives relay zone allocation information for allocating a plurality of relay zones in a resource region.

The RS may receive the relay zone allocation information from a BS or a higher layer. The relay zone may be allocated for each RS. The relay zone allocation information may be transmitted by considering a size of data transmitted by the RS. The relay zone allocation information may include a variety of information such as an ID of the RS, an ID of the relay zone, a start point and end point of the relay zone over the resource region, a length or size of the relay zone, etc. Further, information on a super-ordinate station may be included such as an ID of the super-ordinate station and relay zone resource allocation information corresponding to the super-ordinate station.

In addition, the RS may receive tunneling zone allocation information for resource allocation of a tunneling zone formed in the relay zone. The tunneling zone allocation information may also be transmitted from the BS or the higher layer. The tunneling zone allocation information may include a variety of information such as an ID of the relay zone to which the tunneling zone belongs, an ID of the tunneling zone, a start point and end point over the resource region to which the tunneling zone is allocated, a length of the tunneling zone, a time or frequency offset, etc. The BS or the higher layer may create or transmit a list of the tunneling zone allocation information, or may transmit the list in a bitmap format to the RS. Further, the tunneling zone allocation information may include allocation information of a tunneling zone to be allocated to another RS in addition to allocation information of a tunneling zone to be allocated to a specific RS.

In step S310, the RS receives data transmitted from a subordinate station.

The data may be transmitted over a relay zone allocated by the relay zone allocation information. In this case, the data may be transmitted over a relay zone allocated to an RS currently receiving the data. Alternatively, data to be transmitted to destination stations may be transmitted over relay zones allocated to the respective destination stations. When data to be transmitted to each destination station is transmitted over the relay zone allocated to each destination station, the data may be transmitted over a tunneling zone allocated in each relay zone.

In step S320, the RS detects tunneling traffic destined to the super-ordinate station from the received data.

In step S330, the RS transmits the tunneling traffic to the super-ordinate station. The tunneling traffic is transmitted over a super-ordinate relay zone allocated to the super-ordinate station by the relay zone allocation information.

Figure 10:
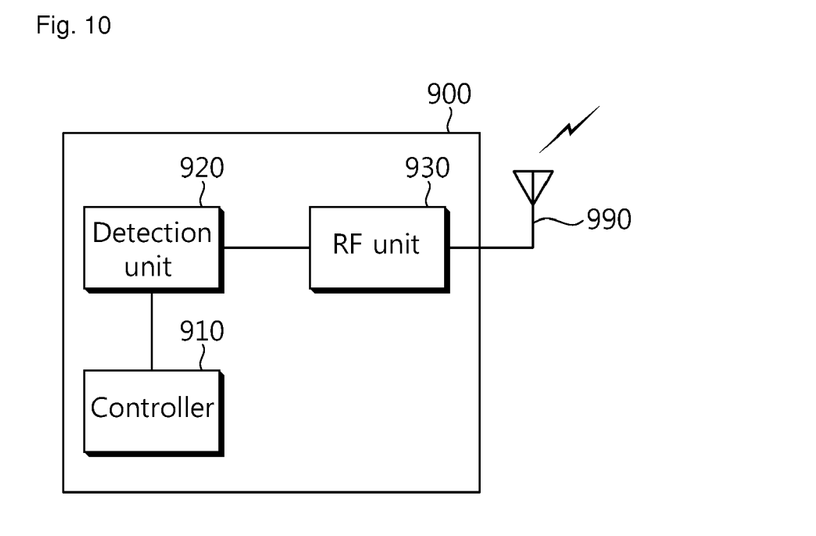
FIG. 10 is a block diagram showing a relay station for implementing an embodiment of the present invention.

FIG. 10 is a block diagram showing an RS for implementing an embodiment of the present invention. An RS 900 includes a controller 910, a detection unit 920, and a radio frequency (RF) unit 930.

Referring to FIG. 10, the controller 910 and the detection unit 920 implement the proposed functions, processes, and/or methods. The detection unit 920 is coupled to the RF unit 930, and configured to detect tunneling traffic destined to a subordinate station. The controller 910 is configured to receive relay zone allocation information for allocating a plurality of relay zones in a resource region, receive data transmitted from a super-ordinate station, and transmit the tunneling traffic to the subordinate station. The tunneling traffic is transmitted over a subordinate relay zone which is allocated to the subordinate station by the relay zone allocation information. The RF unit 930 is coupled to the detection unit 920, and transmits and/or receives a radio signal.

The controller 910 and the detection unit 920 may include an application-specific integrated circuit (ASIC), a separate chipset, a logic circuit, and/or a data processing unit. The RF unit 930 may include a base-band circuit for processing a radio signal. When the embodiment of the present invention is implemented in software, the aforementioned methods can be implemented with a module (i.e., process, function, etc.) for performing the aforementioned functions.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method of relaying data in a wireless communication system, the method comprising:
   receiving, by a relay station (RS), relay zone allocation information, a plurality of relay zones being allocated in a resource region by the relay zone allocation information;
   receiving, by the RS, tunneling zone allocation information;
   receiving, by the RS, data transmitted from a super-ordinate station;
   detecting, by the RS, a tunneling traffic destined to a subordinate station from the data,
   wherein the tunnel traffic is detected based on a constellation value of a symbol level or a log likelihood ratio (LLR) of a bit level;
   modulating, by the RS, the tunneling traffic by applying a modulation scheme that is different from a current modulation scheme; and
   transmitting, from the RS, the tunneling traffic to the subordinate station,
   wherein the tunneling traffic is transmitted over one of the plurality of relay zones, and is transmitted over a subordinate tunneling zone which is allocated in a subordinate relay zone by the tunneling zone allocation information,
   wherein two or more relay zones from the plurality of relay zones share the subordinate tunneling zone, and
   wherein a list of the tunneling zone allocation information created in a bitmap format is transmitted from a base station or a higher layer.

2. The method of claim 1, wherein the one of the plurality of relay zones comprises the subordinate relay zone which is allocated to the subordinate station by the relay zone allocation information.

3. The method of claim 1, further comprising decoding the data except for the tunneling traffic.

4. The method of claim 1, wherein the relay zone allocation information comprises one of an identification (ID) of the relay zone, an ID of the RS in which the relay zone is allocated, a size or a length of the relay zone, and a start point or an end point of the relay zone in the resource region.

5. The method of claim 1, wherein the tunneling zone allocation information comprises one of an identification (ID) of the relay zone in which the tunneling zone is allocated, an ID of the tunneling zone, a size or a length of the tunneling zone, a start point or an end point of the tunneling zone in the resource region, and an offset value.

6. The method of claim 1, wherein the data transmitted from the super-ordinate station is transmitted over each of the plurality of relay zones allocated for respective destination stations of the data.

7. The method of claim 1, wherein the data transmitted from the super-ordinate station is mapped to a medium access control (MAC) protocol data unit (PDU) which is generated for each destination station of the data.

8. The method of claim 7, wherein the MAC PDU of the destination station is combined with a MAC PDU of another destination station existing on the same path.

9. A relay station (RS) in a wireless communication system, the RS comprising:
   a radio frequency (RF) unit for transmitting and receiving a radio signal;
   a detection unit for detecting tunneling traffic destined to a subordinate station; and
   a controller operatively coupled to the detection unit and configured to:
      receive relay zone allocation information, a plurality of relay zones being allocated in a resource region by the relay zone allocation information;
      receive tunneling zone allocation information;
      receive data transmitted from a super-ordinate station;
      detect a tunneling traffic destined to a subordinate station from the data,
      wherein the tunneling traffic is detected based on a constellation value of a symbol level or a log likelihood ratio (LLR) of a bit level;
      modulate the tunneling traffic by applying a modulation scheme that is different from a current modulation scheme; and
      transmit the tunneling traffic to the subordinate station,
      wherein the tunneling traffic is transmitted over one of the plurality of relay zones, and is transmitted over a subordinate tunneling zone which is allocated in a subordinate relay zone by the tunneling zone allocation information,
      wherein two or more relay zones from the plurality of relay zones share the subordinate tunneling zone, and
      wherein a list of the tunneling zone allocation information created in a bitmap format is transmitted from a base station or a higher layer.

* * * * *